US012759293B2

(12) United States Patent
Kanegae et al.

(10) Patent No.: US 12,759,293 B2
(45) Date of Patent: Oct. 13, 2026

(54) LIQUID DISCHARGE HEAD

(71) Applicant: SEIKO EPSON CORPORATION, Tokyo (JP)

(72) Inventors: Takahiro Kanegae, Shiojiri (JP); Hitoshi Takaai, Azumino (JP); Masanori Mikoshiba, Shimosuwa-machi (JP); Yu Shiozawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 114 days.

(21) Appl. No.: 18/829,678

(22) Filed: Sep. 10, 2024

(65) Prior Publication Data

US 2025/0083441 A1 Mar. 13, 2025

(30) Foreign Application Priority Data

Sep. 11, 2023 (JP) ................................ 2023-146683

(51) Int. Cl.
*B41J 2/14* (2006.01)

(52) U.S. Cl.
CPC .. *B41J 2/14233* (2013.01); *B41J 2002/14241* (2013.01); *B41J 2002/14306* (2013.01); *B41J 2002/14338* (2013.01); *B41J 2002/14491* (2013.01)

(58) Field of Classification Search
CPC .......... B41J 2/14233; B41J 2002/14241; B41J 2002/14306; B41J 2002/14338; B41J 2002/14491; B41J 2002/14419; B41J 2202/12
See application file for complete search history.

(56) References Cited

U.S. PATENT DOCUMENTS

| | | | | |
|---|---|---|---|---|
| 7,465,039 | B2 * | 12/2008 | Enomoto | B41J 2/14233 347/68 |
| 2019/0232645 | A1 * | 8/2019 | Kondo | B41J 2/04581 |
| 2021/0402772 | A1 * | 12/2021 | Takabe | B41J 2/14201 |
| 2023/0150259 | A1 | 5/2023 | Shiozawa et al. | |

FOREIGN PATENT DOCUMENTS

| | | |
|---|---|---|
| JP | 2023072166 | 5/2023 |

* cited by examiner

*Primary Examiner* — Henok D Legesse
(74) *Attorney, Agent, or Firm* — WORKMAN NYDEGGER

(57) ABSTRACT

A liquid discharge head includes a pressure chamber substrate provided with a pressure chamber, a first driving element corresponding to the pressure chamber and configured to be driven for discharging a liquid, a flexible circuit board formed of a flexible member and including a connection wire electrically connecting the flexible circuit board to the first driving element, and a sealing plate stacked above the pressure chamber substrate and sealing a space in which the first driving element is provided. The flexible circuit board is mounted on an upper surface of the sealing plate and is connected to the first driving element with the sealing plate interposed therebetween.

13 Claims, 6 Drawing Sheets

LIQUID DISCHARGE HEAD

The present application is based on, and claims priority from JP Application Serial Number 2023-146683, filed Sep. 11, 2023, the disclosure of which is hereby incorporated by reference herein in its entirety.

BACKGROUND

1. Technical Field

The present disclosure relates to a liquid discharge head.

2. Related Art

In the liquid discharge head described in JP-A-2023-72166, when a chip on film (COF: flexible circuit board) is connected to a piezoelectric element, a through hole is provided in a sealing plate, and the COF is mounted on a member such as a pressure chamber substrate or a vibration plate through the through hole. However, a corresponding load is imposed on the member on which the COF is mounted. Therefore, the liquid discharge head described above is designed to withstand the load by the pressure chamber substrate on which the COF is mounted.

On the other hand, in recent years, in order to reduce resistance and inertance as much as possible, a design in which the pressure chamber substrate or the like is made as thin as possible so as not to cause bending has been considered. In this case, the pressure chamber substrate or the like cannot withstand the mounting load of the COF and may be damaged. Therefore, a technique capable of making various substrates as thin as possible and withstand a mounting load of a COF in a liquid discharge head is desired.

SUMMARY

The present disclosure can be implemented as the following aspect.

According to a first aspect of the present disclosure, a liquid discharge head is provided. The liquid discharge head includes a pressure chamber substrate provided with a pressure chamber, a first driving element corresponding to the pressure chamber and configured to be driven for discharging a liquid, a flexible circuit board formed of a flexible member and including a connection wire electrically connecting the flexible circuit board to the first driving element, and a sealing plate stacked above the pressure chamber substrate and sealing a space in which the first driving element is provided, and the flexible circuit board is mounted on an upper surface of the sealing plate and is connected to the first driving element with the sealing plate interposed therebetween.

DESCRIPTION OF EMBODIMENTS

A. First Embodiment

Figure 1:
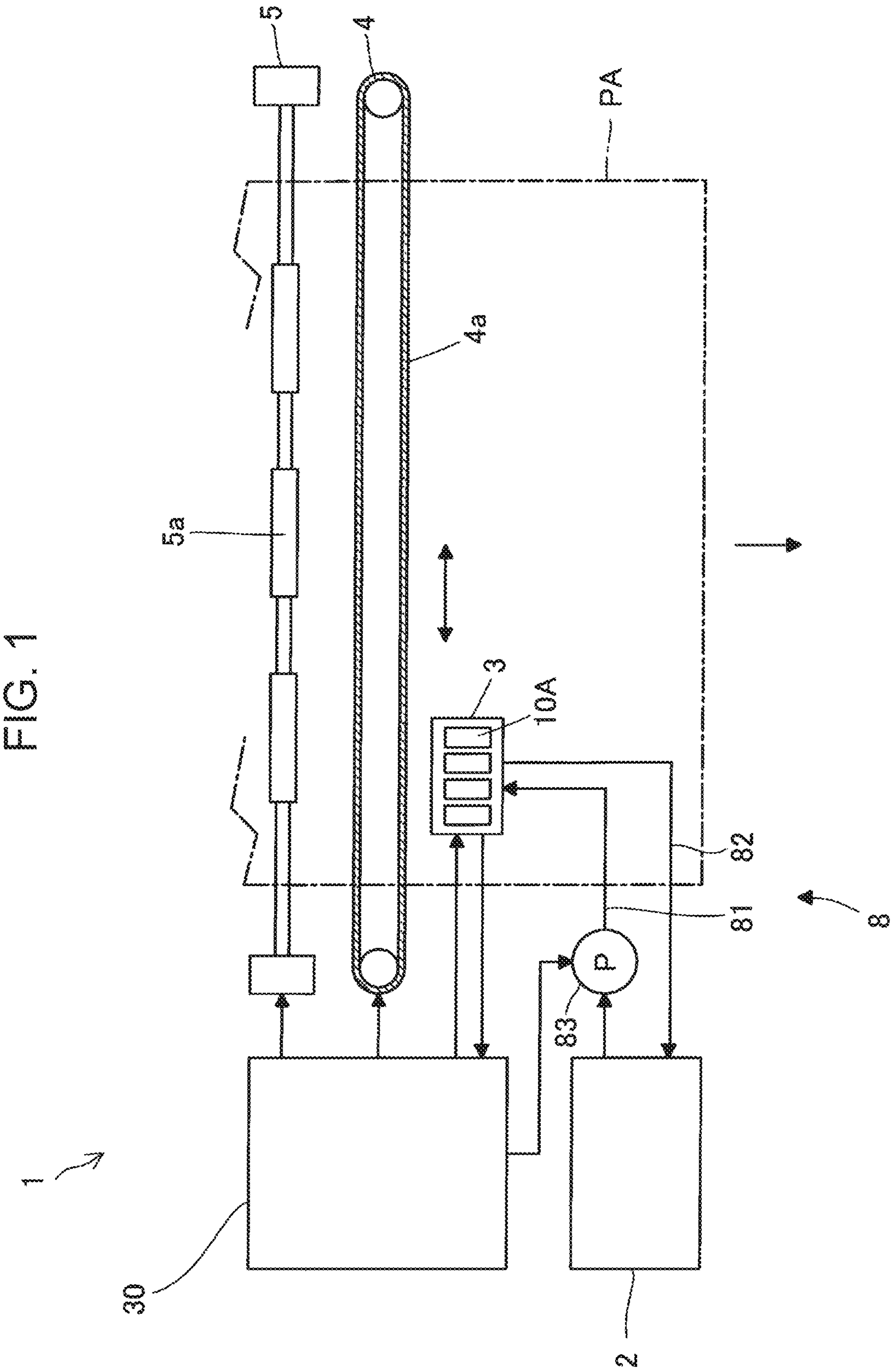
FIG. 1 is an explanatory diagram illustrating a schematic configuration of a liquid discharge apparatus according to a first embodiment of the present disclosure.

A1. Configuration of Liquid Discharge Apparatus 1:

FIG. 1 is an explanatory diagram illustrating a schematic configuration of a liquid discharge apparatus 1 as a first embodiment of the present disclosure. In the present embodiment, the liquid discharge apparatus 1 is an ink jet printer that forms an image by discharging ink as an example of a liquid to printing paper PA (hereinafter, simply referred to as "paper PA"), which is a print medium. In the liquid discharge apparatus 1, instead of the paper PA, an appropriate type of medium such as a resin film or a fabric may be a discharge target of ink.

The liquid discharge apparatus 1 includes a liquid discharge head 10A that discharges ink, a liquid reservoir 2 that stores ink, a carriage 3 in which the liquid discharge head 10A is mounted, a carriage transport mechanism 4 that transports the carriage 3, a medium transport mechanism 5 that transports the paper PA, and a control unit 30. The control unit 30 controls discharge of a liquid.

Examples of a specific mode of the liquid reservoir 2 include a cartridge that can be attached to and removed from the liquid discharge apparatus 1, a bag-shaped ink pack formed of a flexible film, and an ink tank that can be refilled with ink. Note that an appropriate type of ink is stored in the liquid reservoir 2. The liquid discharge apparatus 1 includes a plurality of the liquid reservoirs 2 corresponding to, for example, four colors of ink. The four colors of ink are, for example, cyan, magenta, yellow, and black. The liquid reservoirs 2 may be mounted in the carriage 3.

The liquid discharge apparatus 1 includes a circulation mechanism 8 that circulates ink. The circulation mechanism 8 includes a supply flow path 81 that supplies ink to the liquid discharge head 10A, a collecting flow path 82 that collects ink discharged from the liquid discharge head 10A, and a pump 83 that transports ink.

The carriage transport mechanism 4 includes a transport belt 4*a* for transporting the carriage 3 and a motor. The medium transport mechanism 5 includes a transport roller 5*a* for transporting the paper PA and a motor. The carriage transport mechanism 4 and the medium transport mechanism 5 are controlled by the control unit 30. The liquid discharge apparatus 1 transports the carriage 3 by the carriage transport mechanism 4 while transporting the paper PA by the medium transport mechanism 5, and discharges ink droplets onto the paper PA so as to perform printing.

Figure 2:
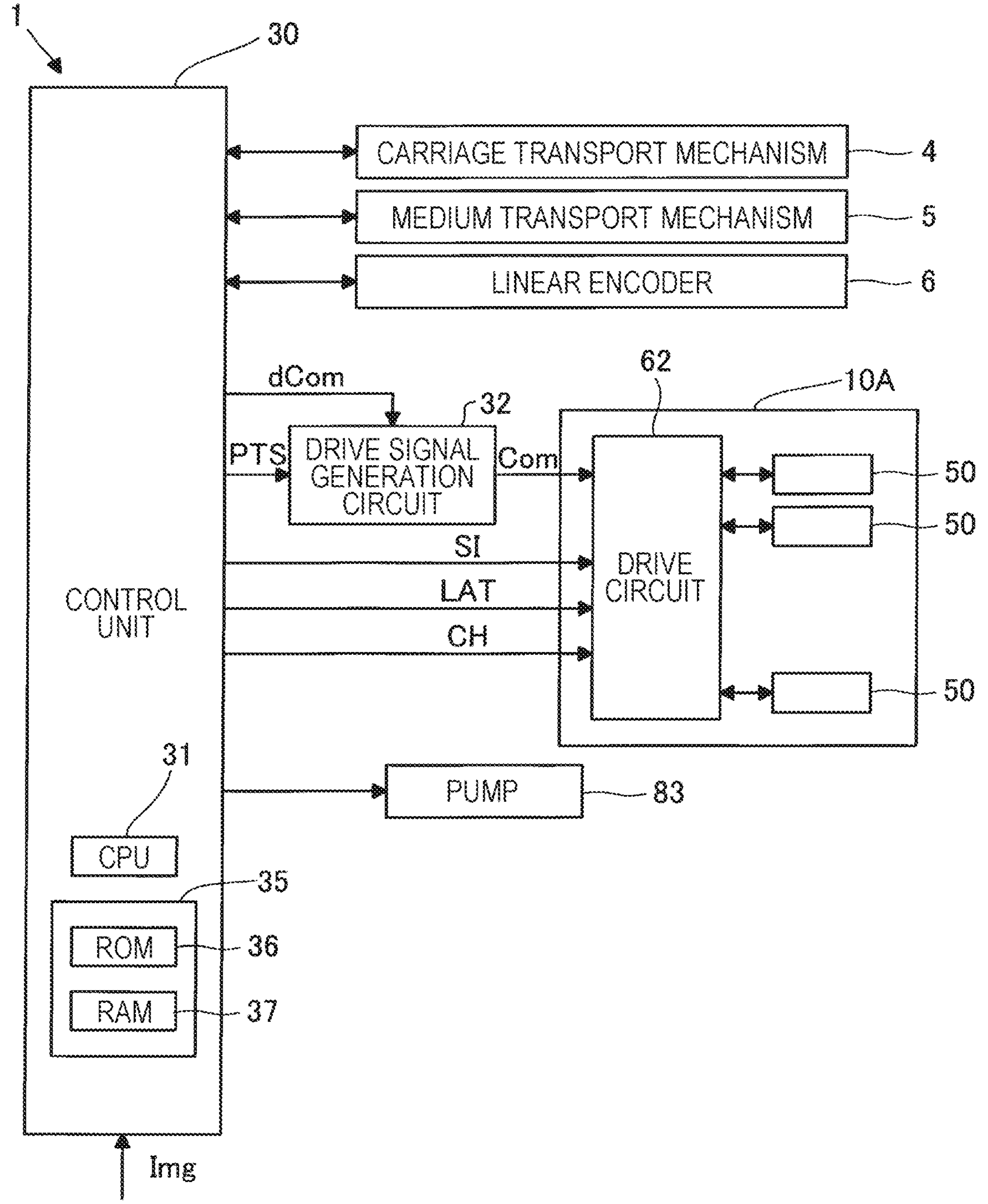
FIG. 2 is a block diagram illustrating the liquid discharge apparatus.

FIG. 2 is a block diagram illustrating the liquid discharge apparatus 1. As illustrated in FIG. 2, the liquid discharge apparatus 1 includes a linear encoder 6. The linear encoder 6 is provided at a position where the position of carriage 3 can be detected. The linear encoder 6 obtains information on the position of the carriage 3. The linear encoder 6 outputs an encoder signal to the control unit 30 in accordance with the movement of the carriage 3.

The control unit 30 includes one or a plurality of CPUs 31. The control unit 30 may include a FPGA instead of or in addition to the CPUs 31. The control unit 30 includes a storing unit 35. The storing unit 35 includes, for example, a ROM 36 and a RAM 37. The storing unit 35 may include an EEPROM or a PROM. The storing unit 35 can store print data Img supplied from a host computer. The storing unit 35 stores a control program of the liquid discharge apparatus 1.

CPU is an abbreviation of central processing unit. FPGA is an abbreviation of field-programmable gate array. RAM is an abbreviation of random access memory. ROM is an abbreviation of read only memory. EEPROM is an abbreviation of electrically erasable programmable read-only memory. PROM is an abbreviation of programmable ROM.

The control unit 30 generates a signal for controlling operation of each unit of the liquid discharge apparatus 1. The control unit 30 can generate a print signal SI and a waveform designation signal dCom. The print signal SI is a digital signal for designating the type of operation of the liquid discharge head 10A. The print signal SI can designate whether or not to supply a drive signal Com to a piezoelectric element 50. The waveform designation signal dCom is a digital signal that regulates the waveform of the drive signal Com. The drive signal Com is an analog signal for driving the piezoelectric element 50.

The liquid discharge apparatus 1 includes a drive signal generation circuit 32. The drive signal generation circuit 32 is electrically connected to the control unit 30. The drive signal generation circuit 32 includes a DA conversion circuit. The drive signal generation circuit 32 generates the drive signal Com having a waveform to be regulated by the waveform designation signal dCom. Upon receiving an encoder signal from the linear encoder 6, the control unit 30 outputs a timing signal PTS to the drive signal generation circuit 32. The timing signal PTS regulates the generation timing of the drive signal Com. The drive signal generation circuit 32 outputs the drive signal Com each time the drive signal generation circuit 32 receives the timing signal PTS.

A drive circuit 62 is electrically connected to the control unit 30 and the drive signal generation circuit 32. The drive circuit 62 switches whether or not to supply the drive signal Com to the piezoelectric element 50 based on the print signal SI. The drive circuit 62 can select the piezoelectric element 50 to which the drive signal Com is supplied based on the print signal SI, a latch signal LAT, and a change signal CH supplied from the control unit 30. The latch signal LAT regulates the latch timing of the print data Img. The change signal CH regulates the selection timing of a drive pulse included in the drive signal Com.

The control unit 30 controls discharge operation of ink by the liquid discharge head 10A. The control unit 30 drives the piezoelectric element 50 and changes the pressure in the ink of in a pressure chamber C so as to discharge the ink from a nozzle N. Detailed configurations of the piezoelectric element 50, the pressure chamber C, the nozzle N, and the like will be described later. The control unit 30 controls the discharge operation when performing printing operation.

A2. Configuration of Liquid Discharge Head 10A

Figure 3:
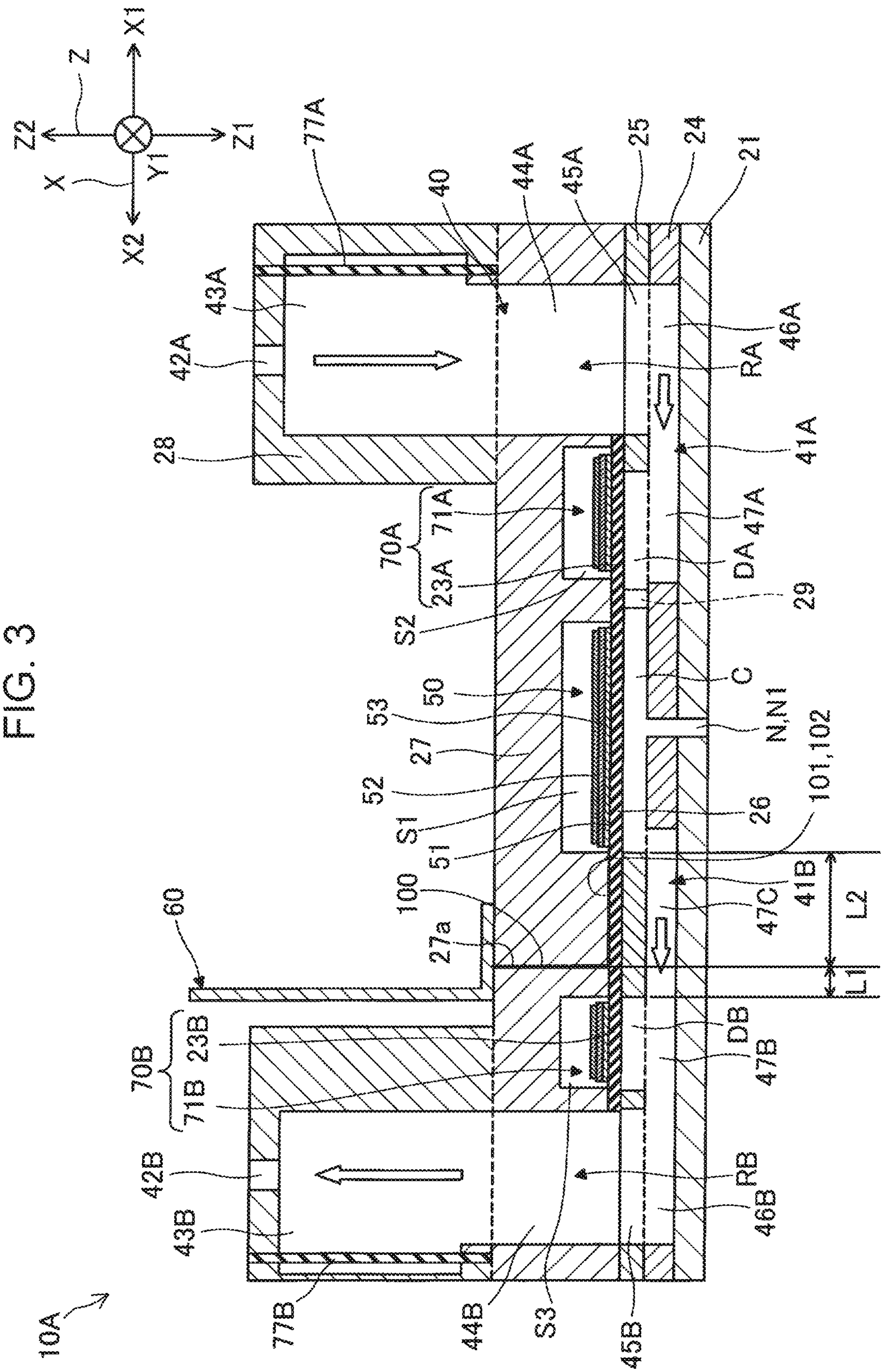
FIG. 3 is a partial cross-sectional view of a liquid discharge head.

Next, a Configuration of the Liquid Discharge Head 10A will be described. FIG. 3 is a partial cross-sectional view of the liquid discharge head 10A. In the following description, three directions intersecting with each other will be described as an X-axis direction, a Y-axis direction, and a Z-axis direction. The liquid discharge head 10A adopts a circulation system that circulates a liquid that flows through common liquid chambers RA and RB described later and the pressure chamber C.

In addition, in the specification, the terms "supply side" and "discharge side" may be used. The "supply side" indicates upstream of the pressure chamber C with respect to a flow path of a liquid. In addition, elements related to upstream of the pressure chamber C may be referred to as elements on the "supply side". For example, as described later, a "compliance substrate on the supply side" may be described. The "discharge side" indicates downstream of the pressure chamber C with respect to a flow path of a liquid. Note that the "discharge side" does not include the nozzle N described later. In addition, elements related to downstream of the pressure chamber C may be referred to as elements on the "discharge side". For example, as described later, a "compliance substrate on the discharge side" may be described.

The liquid discharge head 10A includes a nozzle substrate 21, a communication plate 24, a pressure chamber substrate 25, a vibration plate 26, a sealing plate 27, and the piezoelectric element 50. In addition, the liquid discharge head 10A includes a case 28 and a COF 60. COF is an abbreviation of chip on film and corresponds to a "flexible circuit board". The liquid discharge head 10A includes compliance substrates 23A and 23B, and damper chambers DA and DB. In the present embodiment, the liquid discharge head 10A that discharges ink, which is an example of a liquid, will be described. The liquid is not limited to ink, and the liquid discharge head 10A can discharge other types of liquid.

A thickness direction of the nozzle substrate 21, the communication plate 24, the pressure chamber substrate 25, the vibration plate 26, the sealing plate 27, and the case 28 extends in the Z-axis direction. The nozzle substrate 21 is disposed in a bottom portion of the liquid discharge head 10A. The communication plate 24 is disposed in a Z2 direction of the nozzle substrate 21. The pressure chamber substrate 25 is disposed in the Z2 direction of the communication plate 24. In other words, the communication plate 24 is provided between the pressure chamber substrate 25 and the nozzle substrate 21. The vibration plate 26 and the compliance substrates 23A and 23B are formed in the Z2 direction of the pressure chamber substrate 25.

The sealing plate 27 is disposed in the Z2 direction of the vibration plate 26 and the compliance substrates 23A and 23B. The sealing plate 27 includes portions outside the compliance substrates 23A and 23B in the X-axis direction. The outside portions of the sealing plate 27 in the X-axis direction are located in the Z2 direction of the pressure chamber substrate 25. The sealing plate 27 covers the vibration plate 26, the compliance substrates 23A and 23B, a plurality of the piezoelectric elements 50, and the pressure chamber substrate 25. The case 28 is disposed on the sealing plate 27. Each of the piezoelectric elements 50 is provided corresponding to the pressure chamber C.

Next, a flow path 40 through which ink flows will be described. In the liquid discharge head 10A, the flow path 40 through which ink flows is formed. The flow path 40 includes a supply port 42A, a discharge port 42B, the common liquid chambers RA and RB, the damper chambers DA and DB, the pressure chamber C, communication flow paths 47A to 47C, and the nozzle N.

The flow path 40 includes a supply flow path 41A and a discharge flow path 41B. The supply flow path 41A is a flow path upstream of the pressure chamber C and is a flow path inside the communication plate 24 and the pressure chamber substrate 25. The supply flow path 41A includes a flow path 45A, a communication flow path 46A, and the damper chamber DA. The discharge flow path 41B is a flow path downstream of the pressure chamber C and is a flow path inside the communication plate 24 and the pressure chamber substrate 25. The discharge flow path 41B includes the communication flow path 47C, a communication flow path 47B, the damper chamber DB, a flow path 46B, and a flow path 45B. Note that the supply flow path 41A does not include a flow path 44A inside the sealing plate 27 and a flow path 43A inside the case 28. The discharge flow path 41B does not include a flow path 44B inside the sealing plate 27 and a flow path 43B inside the case 28.

The common liquid chamber RA is provided in common with respect to a plurality of the pressure chambers C. The common liquid chamber RA continuously extends in the Y-axis direction. The common liquid chamber RA includes the flow path 43A provided in the case 28, the flow path 44A provided in the sealing plate 27, the flow path 45A provided in the pressure chamber substrate 25, and the flow path 46A provided in the communication plate 24. The above-described flow paths 43A, 44A, 45A, and 46A are continuously arranged in the Z-axis direction.

A plurality of the communication flow paths 47A is provided corresponding to the plurality of pressure chambers C, respectively. The plurality of communication flow paths 47A is disposed downstream of the common liquid chamber RA. The communication flow paths 47A are in communication with the flow path 46A. The flow path 45A and the flow path 46A are examples of a "common supply flow path".

A plurality of the damper chambers DA is provided corresponding to the plurality of pressure chambers C, respectively. The plurality of damper chambers DA is provided between the plurality of communication flow paths 47A and the plurality of pressure chambers C, respectively. The damper chambers DA are located in the Z2 direction of the communication flow paths 47A. The damper chambers DA are in communication with downstream of the communication flow paths 47A. The damper chambers DA are located in an X1 direction of the pressure chambers C. The damper chambers DA are in communication with upstream of the pressure chambers C. A narrow portion 29 whose width in the Y-axis direction is decreased is provided near a boundary between the damper chambers DA and the pressure chambers C. Each communication flow path 47A and each damper chamber DA are examples of an "individual flow path" on the supply side. The damper chamber DA is a damper chamber on the supply side and corresponds to a "supply-side absorption chamber". Note that the damper chamber DA is not an essential constituent and does not have to be provided.

A plurality of the nozzles N is in communication with the plurality of pressure chambers C, respectively. Nozzles N are located in a Z1 direction of the pressure chambers C.

A plurality of the communication flow paths 47C is provided corresponding to the plurality of pressure chambers C, respectively. The plurality of communication flow paths 47C is in communication with downstream of the pressure chambers C. The communication flow paths 47B corresponding to the plurality of communication flow paths 47C, respectively, are disposed downstream of the communication flow paths 47C.

A plurality of the dumper chambers DB is provided corresponding to the plurality of pressure chambers C, respectively. The damper chambers DB are located in the Z2 direction of the communication flow paths 47B. The plurality of damper chambers DB is in communication with a plurality of the communication flow paths 47B, respectively. The damper chambers DB are in communication with the pressure chambers C through the communication flow paths 47B and 47C. Each of the communication flow paths 47B and 47C, and each damper chamber DB are examples of an "individual flow path" on the discharge side. The damper chamber DB is a damper chamber on the discharge side and corresponds to a "discharge-side absorption chamber". Note that the damper chamber DB is not an essential constituent and does not have to be provided.

The common liquid chamber RB is provided in common with respect to the plurality of pressure chambers C. The common liquid chamber RB is in communication with the plurality of communication flow paths 47B in common. The common liquid chamber RB is in communication with the pressure chambers C through the communication flow paths 47B and 47C. The common liquid chamber RB is disposed downstream of the communication flow paths 47B.

The common liquid chamber RB continuously extends in the Y-axis direction. The common liquid chamber RB includes the flow path 43B provided in the case 28, the flow path 44B provided in the sealing plate 27, the flow path 45B provided in the pressure chamber substrate 25, and the flow path 46B provided in the communication plate 24. The above-described flow paths 43B, 44B, 45B, and 46B are continuously arranged in the Z-axis direction. The flow path 45B and the flow path 46B are examples of a "common discharge flow path".

The ink inside each liquid reservoir 2 is transported by the pump 83, flows inside the supply flow path 81 (see FIG. 1), passes through the supply port 42A illustrated in FIG. 3, and flows into the common liquid chamber RA. The ink inside the common liquid chamber RA passes through the communication flow paths 47A and the damper chambers DA and is supplied to the pressure chambers C. A part of the ink inside the pressure chambers C is discharged from the nozzles N.

The ink that is not discharged from the nozzles N passes through the communication flow paths 47C and the communication flow paths 47B and flows into the common liquid chamber RB. A part of the ink that flows through the communication flow paths 47C flows into the damper chambers DB. The ink inside the common liquid chambers RB flows into the collecting flow path 82 (see FIG. 1) through the discharge port 42B and is collected to the liquid reservoir 2. In the liquid discharge head 10A, ink is circulated in this manner.

A3. Configuration of Each Substrate

The plurality of nozzles N is formed in the nozzle substrate 21. The plurality of nozzles N constitutes a nozzle row N1. The nozzle row N1 includes the plurality of nozzles N arranged in the Y-axis direction. Each nozzle N is a through hole extending through the nozzle substrate 21 in the Z-axis direction.

As illustrated in FIG. 3, the flow path 46A, which is a part of the common liquid chamber RA, the communication flow path 47A, the communication flow paths 47C, the communication flow paths 47B, and the flow path 46B, which is a part of the common liquid chamber RB are formed in the communication plate 24. The communication flow paths 47A, the communication flow paths 47C, and the communication flow paths 47B correspond to a plurality of individual flow paths. That is, the communication plate 24 is provided with some of the plurality of individual flow paths. A through hole, a groove, a recessed portion, and the like are formed in the communication plate 24. By such a through hole, a groove, a recessed portion, and the like, a part of the common liquid chambers RA and RB, and the communication flow paths 47A, 47B, and 47C are formed.

In addition, a part of the plurality of nozzles N is formed in the communication plate 24. Each nozzle N extends through the communication plate 24 and the nozzle substrate 21 in the Z-axis direction. The communication plate 24 corresponds to a "flow path substrate".

As illustrated in FIG. 3, the flow path 45A, which is a part of the common liquid chamber RA, the plurality of damper chambers DA, the plurality of pressure chambers C, the plurality of damper chambers DB, and the flow path 45B, which is a part of the common liquid chamber RB, are formed in the pressure chamber substrate 25. The pressure chamber substrate 25 can be manufactured from, for example, a silicon single-crystal substrate. The pressure chamber substrate 25 may be manufactured from other materials.

The plurality of damper chambers DA extends in the X-axis direction. The damper chambers DA and the common liquid chamber RA are separated from each other in the X-axis direction. The damper chambers DA and the pressure chambers C are each formed as a common space that continuously extends in the X-axis direction. The damper chambers DA extend through the pressure chamber substrate 25 in the Z-axis direction. The damper chambers DA each have a predetermined volume. The plurality of damper chambers DA is disposed in the Y-axis direction at a predetermined interval. Note that a relay flow path may be formed between the respective damper chambers DA and the respective pressure chambers C.

The pressure chambers C extend in the X-axis direction. The pressure chambers C extend through the pressure chamber substrate 25 in the Z-axis direction. The pressure chambers C each have a predetermined volume. The plurality of pressure chambers C is disposed in the Y-axis direction at a predetermined interval. The plurality of pressure chambers C is disposed at the same position as the plurality of damper chambers DA in the Y-axis direction. The plurality of pressure chambers C constitutes a pressure chamber row arranged in the Y-axis direction. The pressure chamber row includes the plurality of pressure chambers C.

The plurality of damper chambers DB extends in the X-axis direction. The damper chambers DB and the pressure chambers C are separated from each other in the X-axis direction. As illustrated in FIG. 3, the communication flow paths 47C are formed between the damper chambers DB and the pressure chambers C. The damper chambers DB and the common liquid chamber RB are separated from each other in the X-axis direction. When viewed in the Z-axis direction, the damper chambers DB are formed so as to overlap with the communication flow paths 47B. The damper chambers DB extend through the pressure chamber substrate 25 in the Z-axis direction. The damper chambers DB and the communication flow paths 47B are in communication in the Z-axis direction. The damper chamber DB each have a predetermined volume. The plurality of damper chambers DB is disposed in the Y-axis direction at a predetermined interval.

As illustrated in FIG. 3, a width of each damper chamber DA on the supply side in the X-axis direction is different from a length of each damper chamber DB on the discharge side in the X-axis direction. A length of the damper chamber DA on the supply side in the X-axis direction is longer than the length of the damper chamber DB on the discharge side in the X-axis direction. A width of the damper chamber DA in the Y-axis direction is the same as a width of the damper chamber DB in the Y-axis direction. A distance in the X-axis direction between each pressure chamber C and the damper chamber DB on the discharge side is longer than a distance in the X-axis direction between the pressure chamber C and the damper chamber DA on the supply side. The COF 60 is mounted at a position, of an upper surface of the sealing plate 27, between the damper chamber DB on the discharge side and the pressure chamber C in the X-axis direction. Note that "between the damper chamber DB and the pressure chamber C" here means that the position of the mounting surface, on which the COF 60 and the upper surface of the sealing plate 27 are in contact with each other, is located between the damper chamber DB and the pressure chamber C.

The vibration plate 26 is disposed on an upper surface of the pressure chamber substrate 25. The vibration plate 26 covers an opening of the pressure chamber substrate 25. The vibration plate 26 includes an elastic layer and an insulating layer. The elastic layer is composed of, for example, silicon oxide ($SiO_2$). The insulating layer is composed of, for example, zirconium oxide ($ZrO_2$). The elastic layer is deposited on the pressure chamber substrate 25, and an insulating layer 26*b* is deposited on the elastic layer.

As illustrated in FIG. 3, the plurality of piezoelectric elements 50 is formed on the vibration plate 26. The piezoelectric elements 50 are disposed at positions overlapping with the pressure chambers C when viewed in the Z-axis direction. The piezoelectric elements 50 are provided corresponding to the plurality of pressure chambers C, respectively.

The vibration plate 26 is driven by the piezoelectric elements 50 and vibrates in the Z-axis direction. The vibration plate 26 constituting an upper wall surface of the pressure chambers C is driven by the piezoelectric elements 50 above the pressure chambers C.

The piezoelectric elements 50 each include an individual electrode 51, a common electrode 52, and a piezoelectric layer 53. The individual electrode 51, the piezoelectric layer 53, and the common electrode 52 are stacked in this order on the vibration plate 26. The piezoelectric layer 53 is held between the individual electrode 51 and the common electrode 52. The individual electrode 51 has an elongated shape in the X-axis direction. A plurality of the individual electrodes 51 is arranged with an interval therebetween in the Y-axis direction. The plurality of individual electrodes 51 is disposed corresponding to the plurality of pressure chambers C, respectively. When viewed in the Z-axis direction, the individual electrodes 51 are disposed at positions overlapping with the plurality of pressure chambers C, respectively. The common electrode 52 has a band shape and extends in the Y-axis direction. The common electrode 52 continuously extends so as to cover the plurality of individual electrodes 51.

The individual electrodes 51 each include an underlying layer and an electrode layer. The underlying layer contains, for example, titanium (Ti). The electrode layer contains a low-resistance conductive material such as a platinum (Pt) and iridium (Ir), for example. The electrode layer may be formed of an oxide such as strontium ruthenate ($SrRuO_3$) and lanthanum nickelate ($LaNiO_3$), for example. The piezoelectric layer 53 is formed of, for example, a known piezoelectric material such as lead zirconate titanate ($Pb(Zr,Ti)O_3$) or ceramics.

The common electrode 52 includes an underlying layer and an electrode layer. The underlying layer contains, for example, titanium. The electrode layer contains a low-resistance conductive material such as a platinum and iridium, for example. The electrode layer may be formed of an oxide such as strontium ruthenate and lanthanum nickelate, for example. A region, of the piezoelectric layer 53, between the individual electrode 51 and the common electrode 52 is a driving region. The driving region is formed above each of the plurality of the pressure chambers C.

A predetermined reference voltage is applied to the common electrode 52. The reference voltage is a constant voltage and is set to, for example, a voltage higher than a ground voltage. A holding signal whose voltage is constant is applied to the common electrode 52. A drive signal whose voltage changes is applied to the individual electrode 51. A voltage corresponding to the difference between the reference voltage applied to the common electrode 52 and the drive signal supplied to the individual electrode 51 is applied to the piezoelectric layer 53. The drive signal corresponds to a discharge amount of a liquid discharged from the nozzle N.

When a voltage is applied between the individual electrode 51 and the common electrode 52 so that the piezoelectric layer 53 is deformed, the piezoelectric element 50 generates energy that bends and deforms the vibration plate 26. When the vibration plate 26 vibrates by the energy generated by the piezoelectric element 50, the pressure of the liquid inside the pressure chamber C changes, and the liquid inside the pressure chamber C is discharged from the nozzle N.

The COF 60 includes a drive IC, a COM wire in COF, and a VBS wire in COF. The COF 60 is, for example, an FPC. The COF 60 may be, for example, FFC. FPC is an abbreviation of flexible printed circuit. FFC is an abbreviation of flexible flat cable.

The COM wire in COF is connected to a TSV wire 100 described later, and the COF 60 is electrically connected to the individual electrode 51 of the piezoelectric element 50 through the COM wire in COF, the TSV wire 100, and a COM wire 101 described later. In addition, the VBS wire in COF is connected to the TSV wire 100 described later, and the COF 60 is electrically connected to the common electrode 52 of the piezoelectric element 50 through the VBS wire in COF, the TSV wire 100, and a VBS wire 102 described later. The COF 60 is electrically connected to a circuit board (not illustrated). The circuit board includes the drive signal generation circuit 32 illustrated in FIG. 2.

The drive IC mounted in the COF 60 includes a switching element for driving the piezoelectric element 50. The drive IC is electrically connected to the control unit 30 illustrated in FIG. 2. The drive IC receives the drive signal Com output from the drive signal generation circuit 32. The switching element of the drive IC switches whether or not to supply the drive signal Com generated by the drive signal generation circuit 32 to the piezoelectric element 50. The drive IC supplies a drive voltage or a current to the piezoelectric element 50 so as to vibrate the vibration plate 26.

Note that the drive IC does not have to be directly mounted in the COF 60, and for example, the drive IC may be provided outside upstream (the Z2 side in FIG. 3) of the COF separately from the COF 60. However, the COM wire in COF and the VBS wire in COF connected to the TSV wire 100 need to be provided in the COF 60. Note that the COM wire in COF and the VBS wire in COF are also collectively referred to as a connection wire.

A thickness of the communication plate 24 is smaller than a thickness of the pressure chamber substrate 25. The "thickness" here indicates a thickness in the Z-axis direction. In addition, a thickness of the sealing plate 27 is larger than the thickness of the pressure chamber substrate 25. Moreover, the thickness of the sealing plate 27 is larger than a total thickness of the pressure chamber substrate 25 and the communication plate 24.

Next, with reference to FIG. 3, vibration absorption portions 70A and 70B will be described. The liquid discharge head 10A includes the vibration absorption portion 70A on the supply side and the vibration absorption portion 70B on the discharge side. The vibration absorption portion 70A on the supply side is provided corresponding to the damper chamber DA on the supply side. The vibration absorption portion 70B on the discharge side is provided corresponding to the damper chamber DB on the discharge side.

The vibration absorption portion 70A includes the compliance substrate 23A and a piezoelectric element 71A. The piezoelectric element 71A corresponds to a "second driving element". The compliance substrate 23A is located in the X1 direction of the vibration plate 26. The compliance substrate 23A is disposed on the upper surface of the pressure chamber substrate 25. The compliance substrate 23A covers a portion, of the opening of the pressure chamber substrate 25, corresponding to the damper chamber DA. The compliance substrate 23A constitutes an upper wall surface of the damper chamber DA. The compliance substrate 23A is disposed at a position corresponding a sealed space S2 formed in the sealing plate 27 when viewed in the Z-axis direction.

The compliance substrate 23A includes a flexible film. The compliance substrate 23A includes an elastic layer and an insulating layer. The elastic layer is composed of, for example, silicon oxide ($SiO_2$). The insulating layer is composed of, for example, zirconium oxide ($ZrO_2$). The elastic layer is deposited on the pressure chamber substrate 25, and the insulating layer is deposited on the elastic layer. The elastic layer is formed so as to be continuous with the elastic layer of the vibration plate 26 that covers the pressure chamber C. The insulating layer is formed so as to be continuous with the insulating layer of the vibration plate 26.

A plurality of the compliance substrates 23A is provided corresponding to the plurality of damper chambers DA arranged in the Y-axis direction, respectively. The compliance substrates 23A are deformable by receiving pressure of ink. The compliance substrates 23A are deformed by the pressure of ink and can absorb a pressure change in the ink inside the damper chambers DA. The plurality of compliance substrates 23A individually changes corresponding to the plurality of damper chambers DA.

A plurality of the piezoelectric elements 71A is formed on the compliance substrates 23A. The piezoelectric elements 71A are disposed at positions overlapping with the damper chambers DA when viewed in the Z-axis direction. The piezoelectric elements 71A are provided corresponding to the plurality of damper chambers DA, respectively.

The vibration absorption portion 70B includes the compliance substrate 23B and a piezoelectric element 71B. The piezoelectric element 71B corresponds to a "third driving element". The compliance substrate 23B is located in the X2 direction of the vibration plate 26. The compliance substrate 23B is located on a side opposite to the compliance substrate 23A with respect to the vibration plate 26 in the X-axis direction. The compliance substrate 23B is disposed on the upper surface of the pressure chamber substrate 25. The compliance substrate 23B covers a portion, of the opening of the pressure chamber substrate 25, corresponding to the damper chamber DB. The compliance substrate 23B constitutes an upper wall surface of the damper chamber DB. The compliance substrate 23B is disposed at a position corresponding a sealed space S3 formed in the sealing plate 27 when viewed in the Z-axis direction.

The compliance substrate 23B includes a flexible film. The compliance substrate 23B includes an elastic layer and an insulating layer. The elastic layer is composed of, for example, silicon oxide ($SiO_2$). The insulating layer is composed of, for example, zirconium oxide ($ZrO_2$). The elastic layer is deposited on the pressure chamber substrate 25, and the insulating layer is deposited on the elastic layer. The elastic layer is formed so as to be continuous with the elastic layer of the vibration plate 26. The insulating layer is formed so as to be continuous with the insulating layer of the vibration plate 26.

A plurality of the compliance substrates 23B is provided corresponding to the plurality of damper chambers DB arranged in the Y-axis direction, respectively. The compliance substrates 23B are deformable by receiving pressure of ink. The compliance substrates 23B are deformed by the pressure of ink and can absorb a pressure change in the ink inside the damper chambers DB. The plurality of compliance substrates 23B individually changes corresponding to the plurality of damper chambers DB.

A plurality of the piezoelectric elements 71B is formed on the compliance substrates 23B. The piezoelectric elements 71B are disposed at positions overlapping with the damper chambers DB when viewed in the Z-axis direction. The piezoelectric elements 71B are provided corresponding to the plurality of damper chambers DB, respectively.

Configurations of the piezoelectric elements 71A and 71B are the same as the piezoelectric element 50. The COF 60 is connected to the piezoelectric elements 71A and 71B with the sealing plate 27 interposed therebetween. The piezoelectric elements 71A and 71B is configured to be driven at a different timing from the piezoelectric element 50 for, for example, assisting driving of the piezoelectric element 50 and circulation of ink. In addition, the piezoelectric elements 71A and 71B may be caused to function as pressure sensors that detect displacement inside the damper chambers DA and DB and convert the displacement into pressure based on the voltage change of the displacement. In addition, the piezoelectric elements 71A and 71B may be caused to function as temperature sensors. Note that as described above, the damper chambers DA and DB are not essential constituents. Therefore, when the damper chambers DA and DB are not provided, the piezoelectric elements 71A and 71B do not have to be provided accordingly. In addition, even when the damper chambers DA and DB are provided, the piezoelectric elements 71A and 71B do not necessarily have to be provided, and even when the piezoelectric elements 71A and 71B are provided, the piezoelectric elements 71A and 71B do not have to have a function of detection, driving, or the like.

The sealing plate 27 has a rectangular shape when viewed in the Z-axis direction. The sealing plate 27 protects the pluralities of piezoelectric elements 50, 71A, and 71B and also reinforces mechanical strength of the pressure chamber substrate 25, the vibration plate 26, and the compliance substrates 23A and 23B. The sealing plate 27 is bonded to the vibration plate 26 by, for example, an adhesive. The sealing plate 27 is fixed to the pressure chamber substrate 25 with the vibration plate 26 and the compliance substrates 23A and 23B interposed therebetween.

The sealed spaces S1 to S3 are formed in the sealing plate 27. Recessed portions are formed on a lower surface of the sealing plate 27. The spaces formed by the recessed portions are the sealed spaces S1 to S3. Each of the sealed spaces S1 to S3 is formed so as to extend continuously in the Y-axis direction. The sealed space S1 is formed so as to overlap with the plurality of pressure chambers C when viewed in the Z-axis direction. The sealed space S1 houses the plurality of piezoelectric elements 50. The sealed space S2 is formed so as to overlap with the plurality of damper chambers DA when viewed in the Z-axis direction. The sealed space S2 houses the plurality of piezoelectric elements 71A. The sealed space S3 is formed so as to overlap with the plurality of damper chambers DB when viewed in the Z-axis direction. The sealed space S3 houses the plurality of piezoelectric elements 71B.

In the sealing plate 27, the flow path 44A included in the common liquid chamber RA and the flow path 44B included in the common liquid chamber RB are formed. The flow paths 44A and 44B are formed so as to extend through the sealing plate 27 in the Z-axis direction. The flow path 44A is located in the X1 direction of the sealed space S2. The flow path 44B is located in the X2 direction of the sealed space S3.

The case 28 is located in the Z2 direction of the sealing plate 27. In the case 28, the supply port 42A, the discharge port 42B, and the flow paths 43A and 43B are formed. The flow path 43A is included in the common liquid chamber RA. The flow path 43A is formed so as to overlap with the flow path 44A of the sealing plate 27 when viewed in the Z-axis direction. The supply port 42A is in communication with the flow path 43A. The flow path 43B is included in the common liquid chamber RB. The flow path 43B is formed so as to overlap with the flow path 44B of the sealing plate 27 when viewed in the Z-axis direction. The discharge port 42B is in communication with the flow path 43B.

Next, compliance substrates 77A and 77B provided in the common liquid chambers RA and RB will be described. The compliance substrates 77A and 77B are different from the compliance substrates 23A and 23B corresponding to the damper chambers DA and DB. Note that in FIG. 3, the compliance substrates 77A and 77B are not exposed to the outside of the liquid discharge head 10A, but the compliance substrates 77A and 77B may be exposed to the outside of the liquid discharge head 10A.

The compliance substrate 77A is provided corresponding to the flow path 43A of the common liquid chamber RA. The compliance substrate 77A is located in the X1 direction of the flow path 43A. The compliance substrate 77A is disposed so as to cover an opening that forms the flow path 43A. A thickness direction of the compliance substrate 77A extends in the X-axis direction. The compliance substrate 77A extends in the Y-axis direction. The compliance substrate 77A is fixed to the case 28.

The compliance substrate 77B is provided corresponding to the flow path 43B of the common liquid chamber RB. The compliance substrate 77B is located in the X2 direction of the flow path 43B. The compliance substrate 77B is disposed so as to cover an opening that forms the flow path 43B. A thickness direction of the compliance substrate 77B extends in the X-axis direction. The compliance substrate 77B extends in the Y-axis direction. The compliance substrate 77B is fixed to the case 28.

The compliance substrates 77A and 77B may have the same configurations as, for example, the compliance substrates 23A and 23B. The compliance substrates 77A and 77B each include an elastic layer and an insulating layer. The elastic layer is composed of, for example, silicon oxide ($SiO_2$). The insulating layer is composed of, for example, zirconium oxide ($ZrO_2$).

The compliance substrate 77A is deformable by receiving pressure of ink inside the flow path 43A of the common liquid chamber RA. The compliance substrate 77A is deformed by the pressure of ink and can absorb a pressure change in the ink inside the flow path 43A of the common liquid chamber RA.

The compliance substrate 77B is deformable by receiving pressure of ink inside the flow path 43B of the common liquid chamber RB. The compliance substrate 77B is deformed by the pressure of ink and can absorb a pressure change in the ink inside the flow path 43B of the common liquid chamber RB.

In addition, in the liquid discharge head 10A, since the piezoelectric elements 71A are provided on the compliance substrates 23A, the piezoelectric elements 71A can be deformed in accordance with deformation of the compliance substrates 23A, and vibration of the ink in the damper chambers DA can be absorbed. In addition, through providing of the piezoelectric elements 71A on the compliance substrates 23A, the compliance substrates 23A can be reinforced. The same applies to the piezoelectric elements 71B.

In addition, in the liquid discharge head 10A, since the vibration plate 26 and the compliance substrates 23A and 23B are constituted as one unit, and configurations of the piezoelectric elements 71A and 71B on the compliance substrates 23A and 23B are the same as the configuration of the piezoelectric elements 50 on the vibration plate 26, the piezoelectric elements 71A and 71B can be easily manufactured.

Next, connection between the COF 60 and each of the piezoelectric elements 50, 71A, and 71B will be described. As illustrated in FIG. 3, the COF 60 is electrically connected to each of the piezoelectric elements 50, 71A, and 71B by the through silicon via (TSV) wire 100 extending through the sealing plate 27. Note that in FIG. 3, the TSV wire 100 is schematically illustrated, and only the TSV wire 100 that electrically connects the COF 60 to the piezoelectric element 50 of each pressure chamber C is illustrated as an example, but the COF 60 is also electrically connected to the piezoelectric elements 71A and 71B of each of the damper chambers DA and DB by the TSV wire 100 through the sealing plate 27. In addition, in FIG. 3, the COM wire 101 and the VBS wire 102 disposed on a bottom surface of the sealing plate 27 and connected to the TSV wire 100 are schematically illustrated.

Figure 4:
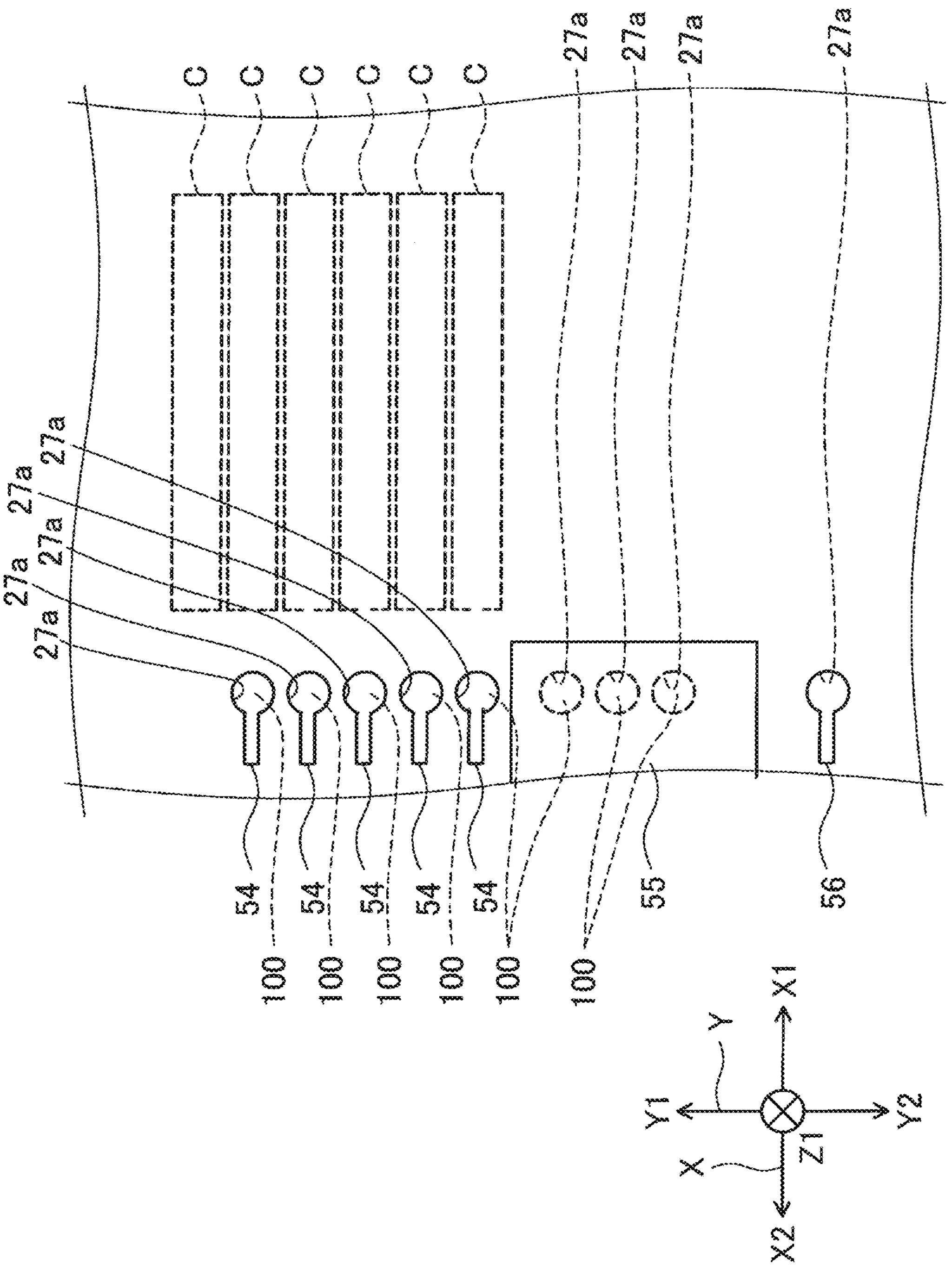
FIG. 4 is a plan view illustrating a part of a sealing plate.

FIG. 4 is a plan view for explaining a plurality of wires mounted in the COF 60 and a view of a mounting wire portion in the Z1 direction. As illustrated in FIG. 4, the sealing plate 27 includes a plurality of through holes 27*a* extending through the sealing plate 27 in the Z-axis direction. The COF 60 includes a plurality of mounting wires for COM 54 extending in the X-axis direction. Each mounting wire for COM 54 is connected to the COM wire 101 through the TSV wire 100 disposed inside a corresponding one of the through holes 27*a*. The COM wire 101 is electrically connected to the COF 60 and the individual electrode 51. A plurality of the COM wires 101 is connected to the plurality of individual electrodes 51, respectively. A plurality of the TSV wires 100 is each connected to an end portion of the mounting wire for COM 54 in the X1 direction, is drawn out in the Z1 direction through a corresponding one of the through holes 27*a*, and is connected to a corresponding one of the COM wires 101 in a lower end portion that is drawn out. A drive signal from the drive circuit 62 is applied to each individual electrode 51 through the COM wire 101. The COM wire 101 is formed of a conductive material whose resistance is lower than the individual electrode 51. For example, the COM wire 101 is a conductive pattern having a structure in which a conductive film of gold (Au) is stacked on a surface of a conductive film formed of nichrome (NiCr).

Moreover, the COF 60 includes a mounting wire for VBS 55. The mounting wire for VBS 55 is connected to the VBS wire 102 through the TSV wire 100 disposed inside the through hole 27*a*. The mounting wire for VBS 55 is located at a position further in the Y2 direction than is the mounting wire for COM 54. In the example illustrated in FIG. 4, five through holes 27*a* for the COM wire 101 are illustrated, and three through holes 27*a* for the VBS wire 102 are illustrated. Note that the TSV wires 100 extending inside the three through holes 27*a* configure a parallel circuit and are finally connected to one common electrode 52. A common reference voltage is applied to the common electrode 52 through the VBS wire 102.

Moreover, the COF 60 includes a mounting wire for damper chamber 56 connected to the piezoelectric element 71A of the damper chamber DA on the supply side. The mounting wire for damper chamber 56 is located at a position further in the Y2 direction than is the mounting wire for VBS 55. The through holes 27*a* through which the mounting wire for COM 54, the mounting wire for VBS 55, and the mounting wire for damper chamber 56 are drawn out in the Z1 direction are provided in line in the Y-axis direction. Note that in FIG. 4, a mounting wire connected to the piezoelectric element 71B of the damper chamber DB on the discharge side is omitted, but is provided in an end portion on the Y1 direction side (in an upper portion illustrated in FIG. 4) in a similar manner to the mounting wire for damper chamber 56.

As illustrated in FIG. 3, a distance L1 in the X-axis direction between the COF 60 and the damper chamber DB on the discharge side is shorter than a distance L2 in the X-axis direction between the COF 60 and the pressure chamber C. That is, the COF 60 is mounted at a position closer to the damper chamber DB on the discharge side than to the pressure chamber C.

According to the liquid discharge head 10A and the liquid discharge apparatus 1 of the above-described first embodiment, the following effects can be exhibited.

In the above-described first embodiment, the COF 60 is mounted on the upper surface of the sealing plate 27 and is connected to the piezoelectric element 50 with the sealing plate 27 interposed therebetween. As a comparative example, for example, in a configuration in which a through hole extending through the sealing plate in the Z-axis direction is provided, and the COF 60 is mounted on the pressure chamber substrate in a state in which the COF 60 is located inside the through hole, a load of the COF is imposed only on the pressure chamber substrate 25 and the communication plate 24. Therefore, a design that can withstand the load by the pressure chamber substrate 25 in which the COF 60 is mounted needs to be adopted. However, this configuration cannot meet the demand for making the pressure chamber substrate 25 and the like as thin as possible so as to reduce resistance and inertance as much as possible. According to the above-described first embodiment, the liquid discharge head 10A capable of making the various substrates 24, 25, and 27 as thin as possible and withstand the mounting load of the COF 60 can be provided.

In the above-described first embodiment, the COF 60 is mounted between the damper chamber DB on the discharge side and the pressure chamber C on the upper surface of the sealing plate 27 in the X-axis direction. Since the distance between the pressure chamber C and the damper chamber DB on the discharge side in the X-axis direction is longer than the distance between the pressure chamber C and the damper chamber DA on the supply side in the X-axis direction, routing of a wire for connecting the COF 60 to the piezoelectric element 50 can be easily performed.

Moreover, the COF 60 is mounted at a position closer to the damper chamber DB on the discharge side than to the pressure chamber C. Therefore, since the COF 60 is away from the pressure chamber C, the wiring resistance becomes large, but an error in wiring resistance for each piezoelectric element 50 can be reduced accordingly, and thus variations between driving elements, that is, variations in discharge performance for each nozzle N can be reduced.

In the above-described first embodiment, among the substrates 21, 24, 25, and 27, the sealing plate 27 is the thickest, and the thickness of the communication plate 24 is larger than the thickness of the pressure chamber substrate 25. As in the case of the above-described comparative example, when the COF 60 is mounted on the pressure chamber substrate 25 and the communication plate 24, the communication plate 24 has to have a certain thickness in order to ensure rigidity. However, in the above-described first embodiment in which the COF 60 is mounted on the sealing plate 27, the communication plate 24 can be made thin, unnecessary extension or bending in the flow path 40 is reduced, and inertance and resistance can be reduced.

B. Second Embodiment

Figure 5:
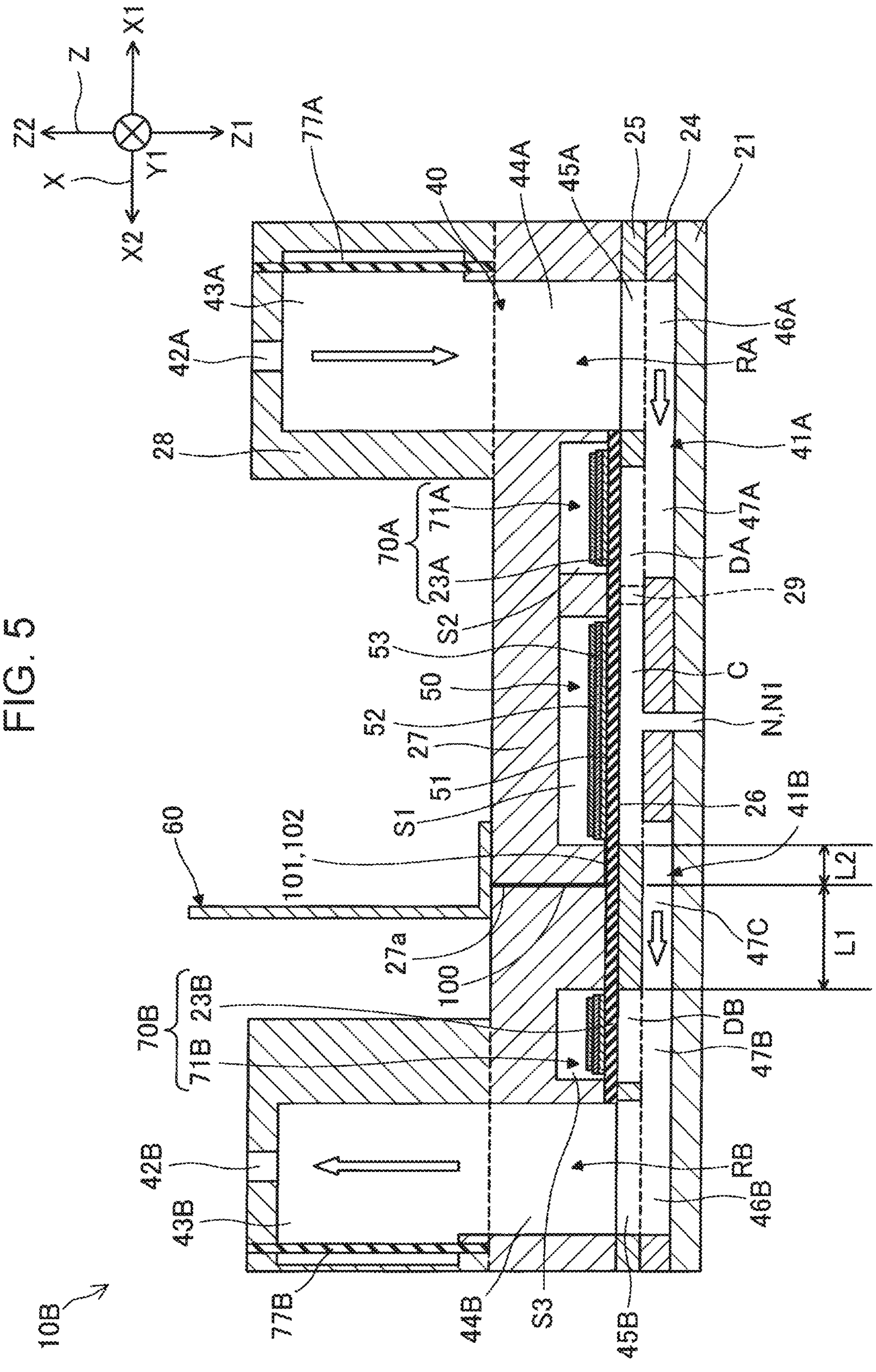
FIG. 5 is a partial cross-sectional view of a liquid discharge head according to a second embodiment of the present disclosure.

Next, a second embodiment of the present disclosure will be described with reference to FIG. 5. Note that the constituents substantially the same as those of the above-described first embodiment are denoted by the same reference numerals, and description thereof is omitted. FIG. 5 is a partial cross-sectional view of a liquid discharge head 10B according to the second embodiment of the present disclosure. In the liquid discharge head 10B of the second embodiment, compared to the liquid discharge head 10A of the first embodiment, the position on the sealing plate 27 in the X-axis direction at which the COF 60 is mounted is different.

As illustrated in FIG. 5, the distance L1 in the X-axis direction between the COF 60 and the damper chamber DB on the discharge side is longer than the distance L2 in the X-axis direction between the COF 60 and the pressure chamber C. That is, the COF 60 is mounted at a position closer to the pressure chamber C than to the damper chamber DA on the supply side. According to this configuration, since the wiring length after TSV can be made short, the wiring resistance can be reduced.

C. Other Embodiments

Figure 6:
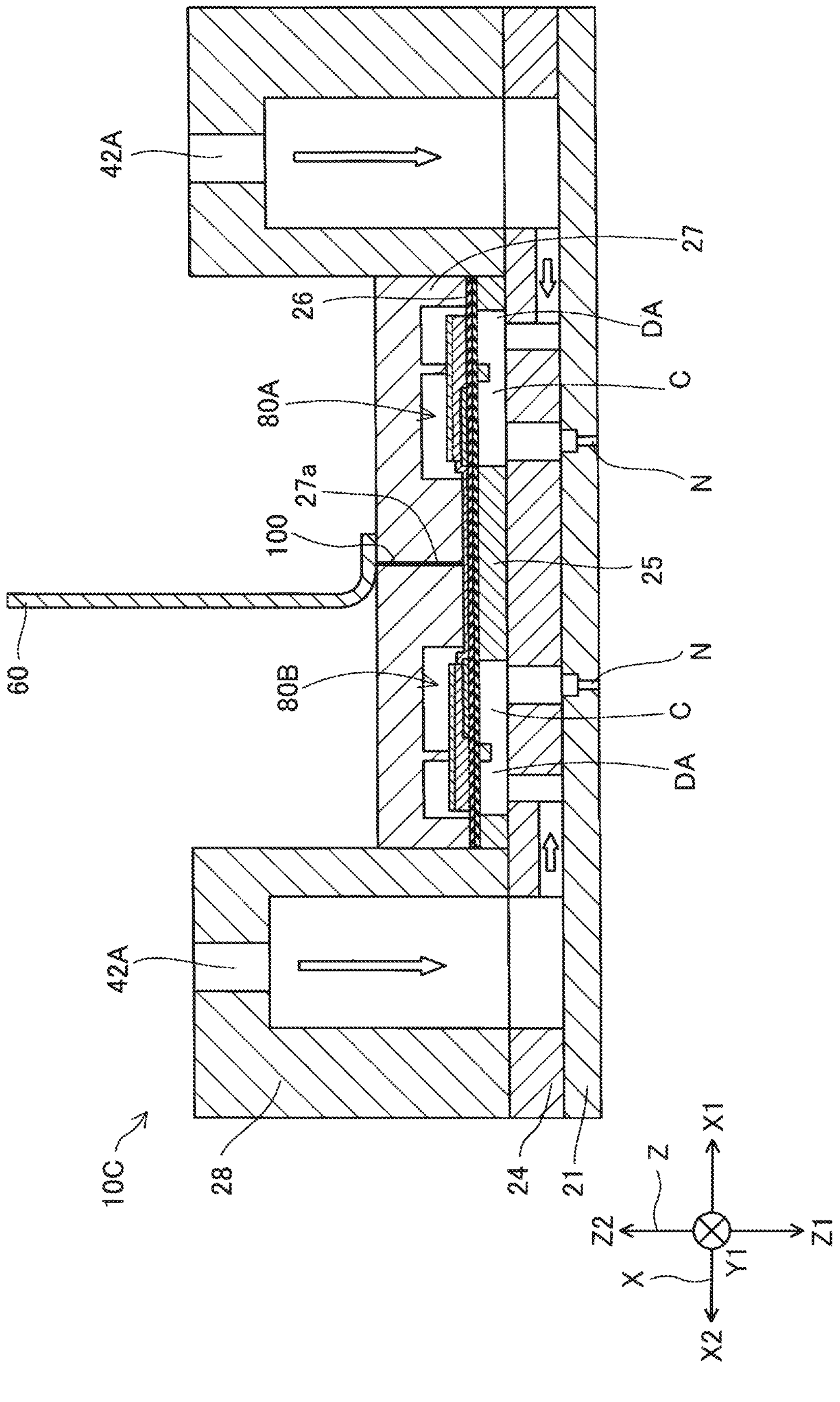
FIG. 6 is a partial cross-sectional view of a liquid discharge head according to another embodiment of the present disclosure.

C1 In the liquid discharge apparatus 1 of the above-described embodiment, a circulation head in which a liquid flowing into the liquid discharge head 10A circulates is adopted, but as illustrated in FIG. 6, a non-circulating liquid discharge head 10C in which a liquid does not circulate may be adopted. In FIG. 6, the constituents substantially the same as those of the above-described embodiments are denoted by the same reference numerals. In the configuration illustrated in FIG. 6 as well, since the COF 60 is mounted on the upper surface of the sealing plate 27, and the COF 60 and each of piezoelectric elements 80A and 80B are connected to each other by the TSV wire 100, the liquid discharge head 10C capable of making the various substrates 24, 25, and 27 as thin as possible and withstand the mounting load of the COF 60 can be provided.

C2 In the above-described embodiments, the through holes 27*a* are arranged in one line in the Y-axis direction, but may be arranged in two lines in an alternate manner in the X-axis direction, or may be arranged in three or more lines. For example, in a case of the liquid discharge apparatus 1 with high resolution, the number of the pressure chambers C is increased, and this configuration can be adopted to a case where the through holes 27*a* cannot be arranged in one line.

C3 In the above-described embodiments, the COF 60 is provided between the pressure chamber C and the damper chamber DB on the discharge side on the upper surface of the sealing plate 27 in the X-axis direction, but may be provided between the pressure chamber C and the damper chamber DA on the supply side.

C4 In the above-described embodiments, the thickness of the sealing plate 27 is larger than the total thickness of the pressure chamber substrate 25 and the communication plate 24, but is not limited thereto, and the thickness of each of the substrates 24, 25, and 27 can be appropriately changed.

C5 In the above-described embodiments, the COF 60 is connected to the piezoelectric element 50 by the TSV wire 100 inserted into the through hole 27*a* provided in the sealing plate 27, but may be connected to the piezoelectric element 50 without using the TSV wire 100 and the through hole 27*a*.

The present disclosure it not limited to the above-described embodiments and can be implemented in various configurations without departing from the spirit and the scope of the disclosure. For example, in order to solve part of or all of the problems described above or in order to achieve part of or all of the advantageous effects described above, technical features in an embodiment corresponding to the technical features of the respective aspects described in the summary may be appropriately replaced or combined. In addition, unless the technical features are described as essential features in the specification, the technical features can be appropriately deleted.

1. According to one aspect of the present disclosure, a liquid discharge head is provided. The liquid discharge head includes a pressure chamber substrate provided with a pressure chamber, a first driving element corresponding to the pressure chamber and configured to be driven for discharging a liquid, a flexible circuit board formed of a flexible member and including a connection wire electrically connecting the flexible circuit board to the first driving element, and a sealing plate stacked above the pressure chamber substrate and sealing a space in which the first driving element is provided, and the flexible circuit board is mounted on an upper surface of the sealing plate and is connected to the first driving element with the sealing plate interposed therebetween. According to this aspect, since the flexible circuit board is mounted on the upper surface of the sealing plate stacked above the pressure chamber substrate, the strength can be increased, and a liquid discharge head capable of making the pressure chamber substrate and the like as thin as possible and withstand the mounting load of the flexible circuit board is provided.
2. In the liquid discharge head of the above-described aspect, the flexible circuit board may be connected to the first driving element through a through hole provided in the sealing plate. According to this aspect, since the flexible circuit board is connected to the first driving element through the through hole, an aspect in which the flexible circuit board is mounted on the upper surface of the sealing plate can be easily implemented.
3. In the liquid discharge head of the above-described aspect, a flow path substrate stacked below the pressure chamber substrate and provided with a plurality of individual flow paths, a common supply flow path that supplies a liquid in common to the plurality of individual flow paths, and a common discharge flow path that discharges a liquid in common from the plurality of individual flow paths may be further included.

4. In the liquid discharge head of the above-described aspect, the pressure chamber substrate may be further provided with a supply-side absorption chamber that is provided between the pressure chamber and the common supply flow path and that absorbs a pressure change in the pressure chamber and a discharge-side absorption chamber that is provided between the pressure chamber and the common discharge flow path and that absorbs a pressure change in the pressure chamber.
5. In the liquid discharge head of the above-described aspect, a second driving element corresponding to the supply-side absorption chamber and different from the first driving element, and a third driving element corresponding to the discharge-side absorption chamber and different from the first driving element and the second driving element may be further included, and the flexible circuit board may be connected to the second driving element and the third driving element with the sealing plate interposed therebetween. According to this aspect, through driving of the second driving element and the third driving element, driving of the first driving element and circulation of a liquid can be assisted. In addition, the second driving element and the third driving element can be functioned as pressure sensors that detect displacement in an absorption chamber and converts the displacement into pressure based on the voltage change of the displacement.
6. In the liquid discharge head of the above-described aspect, the pressure chamber may be located between the supply-side absorption chamber and the discharge-side absorption chamber, a distance between one of the supply-side absorption chamber and the discharge-side absorption chamber and the pressure chamber may be longer than a distance between another one of the supply-side absorption chamber and the discharge-side absorption chamber and the pressure chamber, and the flexible circuit board may be located at a position on the upper surface of the sealing plate between one of the supply-side absorption chamber and the discharge-side absorption chamber and the pressure chamber. According to this aspect, the flexible circuit board is mounted at a position between the absorption chamber whose distance from the pressure chamber is longer and the pressure chamber. Therefore, routing of a wire for connecting the first driving element provided in the pressure chamber and the flexible circuit board can be easily performed.
7. In the liquid discharge head of the above-described aspect, the flexible circuit board may be mounted at a position, of the upper surface of the sealing plate, closer to the pressure chamber than to one of the supply-side absorption chamber and the discharge-side absorption chamber. According to this aspect, since the length of a wire connecting the flexible circuit board and the first driving element can be decreased, the wiring resistance can be reduced.
8. In the liquid discharge head of the above-described aspect, the flexible circuit board may be mounted at a position, of the upper surface of the sealing plate, closer to one of the supply-side absorption chamber and the discharge-side absorption chamber than to the pressure chamber. According to this aspect, since the length of a wire connecting the flexible circuit board and the first driving element is increased, the wiring resistance is increased, but an error in wiring resistance for each first driving element can be reduced accordingly, and thus variations between the first driving elements, that is, variations in liquid discharge performance can be reduced.
9. In the liquid discharge head of the above-described aspect, the flow path substrate may have a thickness smaller than a thickness of the pressure chamber substrate.
10. In the liquid discharge head of the above-described aspect, the sealing plate may have a thickness larger than a thickness of the pressure chamber substrate.
11. In the liquid discharge head of the above-described aspect, the sealing plate may have a thickness larger than a total thickness of the pressure chamber substrate and the flow path substrate.

In addition, the present disclosure is not limited to an ink jet type and can also be applied to appropriate liquid discharge apparatuses that discharge liquids other than ink. For example, the present disclosure can be applied to various liquid discharge apparatuses as follows:

1. Image recording apparatuses such as fax devices
2. Color material discharge apparatuses used for manufacturing color filters for image display devices such as liquid crystal displays
3. Electrode material discharge apparatuses used for forming electrodes of organic electro luminescence (EL) displays, field emission displays (FED), and the like
4. Liquid discharge apparatuses that discharge liquids containing biological organic materials used for manufacturing biochips
5. Specimen discharge apparatuses as precision pipettes
6. Discharge apparatuses of lubricating oil
7. Discharge apparatuses of resin liquids
8. Liquid discharge apparatuses that discharge lubricating oil to precision machinery such as watches or cameras with pinpoint precision
9. Liquid discharge apparatuses that discharge transparent resin liquids such as ultraviolet curable resin liquids onto substrates to form micro-hemispherical lenses (optical lenses) or the like used for optical communication elements or the like
10. Liquid discharge apparatuses that discharge acidic or alkaline etchants for etching substrates or the like
11. Liquid discharge apparatuses including liquid discharge heads that discharge a minute amount of other arbitrary liquid droplets The “liquid droplets” represent liquid states discharged from the liquid discharge apparatuses, the liquid states including granular, tear-like, and thread-like shapes with tails. In addition, the “liquid” mentioned herein may be a material that can be consumed by the liquid discharge apparatuses. For example, the “liquid” may be a material in a state where the material has a liquid phase, and liquid-state materials with high or low viscosities, sol, gel water, and liquid-state materials such as inorganic solvents, organic solvents, solutions, liquid resin, and liquid metal (metallic melt), and the like belong to the “liquid”. In addition to liquids as a state of a material, a material in which particles of functional materials made of solids such as pigments or metallic particles are dissolved in, dispersed in, or mixed with the solvent also belongs to the “liquid”. Moreover, in addition to a combination of ink and a reaction liquid described in the above-described embodiments, typical examples of a combination of a first liquid and a second liquid include the following:

1. A main agent and a softening agent of an adhesive
2. A base coating material and a dilution agent of a coating material, or a clear coating material and a dilution agent
3. A main solvent containing cells of ink for cells and a dilution solvent
4. A metallic leaf pigment dispersion liquid of ink (metallic ink) that develops a feeling of metallic gloss and a dilution solvent
5. Gaslin and light oil, and biofuel of fuel for vehicles
6. A chemical main component and a protective component of a chemical
7. A phosphor and a sealing material of a light emitting diode (LED)

Moreover, the present disclosure is not limited to aspects as the above-described liquid discharge head and liquid discharge apparatus and can be implemented through various modes such as a liquid discharge system, a compound device including a liquid discharge apparatus, or the like.

What is claimed is:

1. A liquid discharge head comprising:

a pressure chamber substrate provided with a pressure chamber;

a first driving element corresponding to the pressure chamber and configured to be driven for discharging a liquid;

a flexible circuit board formed of a flexible member and including a connection wire electrically connecting the flexible circuit board to the first driving element; and a sealing plate stacked above the pressure chamber substrate and sealing a space in which the first driving element is provided, wherein the flexible circuit board is mounted on an upper surface of the sealing plate such that a lower surface of the flexible circuit board is disposed on the upper surface of the sealing plate, and is connected to the first driving element with the sealing plate interposed therebetween.

2. The liquid discharge head according to claim 1, wherein the flexible circuit board is connected to the first driving element through a through hole provided in the sealing plate, the sealing plate has a lower surface facing the pressure chamber substrate and the upper surface, the through hole penetrates the sealing plate from the lower surface to the upper surface, and a wiring different from the flexible circuit board is provided in the through hole and electrically connects the connection wire of the flexible circuit board to the first driving element.

3. The liquid discharge head according to claim 1, further comprising a flow path substrate stacked below the pressure chamber substrate and provided with a plurality of individual flow paths, a common supply flow path that supplies a liquid in common to the plurality of individual flow paths, and a common discharge flow path that discharges a liquid in common from the plurality of individual flow paths.

4. The liquid discharge head according to claim 3, wherein the pressure chamber substrate is further provided with a supply-side absorption chamber that is provided between the pressure chamber and the common supply flow path and that absorbs a pressure change in the pressure chamber and a discharge-side absorption chamber that is provided between the pressure chamber and the common discharge flow path and that absorbs a pressure change in the pressure chamber.

5. The liquid discharge head according to claim 4, further comprising:

a second driving element corresponding to the supply-side absorption chamber and different from the first driving element; and a third driving element corresponding to the discharge-side absorption chamber and different from the first driving element and the second driving element, wherein the flexible circuit board is connected to the second driving element and the third driving element with the sealing plate interposed therebetween.

6. The liquid discharge head according to claim 4, wherein the pressure chamber is located between the supply-side absorption chamber and the discharge-side absorption chamber, a distance between one of the supply-side absorption chamber and the discharge-side absorption chamber and the pressure chamber is longer than a distance between another one of the supply-side absorption chamber and the discharge-side absorption chamber and the pressure chamber, and the flexible circuit board is located at a position on the upper surface of the sealing plate between one of the supply-side absorption chamber and the discharge-side absorption chamber and the pressure chamber.

7. The liquid discharge head according to claim 6, wherein the flexible circuit board is mounted at a position, of the upper surface of the sealing plate, closer to the pressure chamber than to one of the supply-side absorption chamber and the discharge-side absorption chamber.

8. The liquid discharge head according to claim 6, wherein the flexible circuit board is mounted at a position, of the upper surface of the sealing plate, closer to one of the supply-side absorption chamber and the discharge-side absorption chamber than to the pressure chamber.

9. The liquid discharge head according to claim 3, wherein the flow path substrate has a thickness smaller than a thickness of the pressure chamber substrate.

10. The liquid discharge head according to claim 3, wherein the sealing plate has a thickness larger than a total thickness of the pressure chamber substrate and the flow path substrate.

11. The liquid discharge head according to claim 1, wherein the sealing plate has a thickness larger than a thickness of the pressure chamber substrate.

12. The liquid discharge head according to claim 1, wherein the flexible circuit board includes a plurality of connection wires including the connection wire electrically connected to the first driving element, the plurality of connection wires being arranged in an arrangement direction, the flexible circuit board has a mounting portion mounted on the upper surface of the sealing plate, and when viewed in a stacking direction in which the pressure chamber substrate and the sealing plate are stacked, the mounting portion is spaced inward from an end of the sealing plate in a direction orthogonal to both the arrangement direction and the stacking direction.

13. The liquid discharge head according to claim 1, wherein the sealing plate has, on a lower surface facing the pressure chamber substrate, a first recess accommodating the first driving element and a second recess accommodating another driving element different from the first driving element, the first recess and the second recess being arranged in a recess arrangement direction, the flexible circuit board has a bonding portion bonded to the upper surface of the sealing plate, and when viewed in a direction orthogonal to both the recess arrangement direction and a stacking direction in which the pressure chamber substrate and the sealing plate are stacked, at least a part of the bonding portion is located between the first recess and the second recess.

* * * * *